(12) United States Patent
Dixon et al.

(10) Patent No.: US 8,281,258 B1
(45) Date of Patent: Oct. 2, 2012

(54) OBJECT TRAVERSAL TO SELECT FOCUS

(75) Inventors: Scott Dixon, Seattle, WA (US); Donald Ryan Willhoit, Bainbridge Island, WA (US)

(73) Assignee: Amazon Technologies Inc., Reno, NV (US)

( * ) Notice: Subject to any disclaimer, the term of this patent is extended or adjusted under 35 U.S.C. 154(b) by 302 days.

(21) Appl. No.: 12/748,187

(22) Filed: Mar. 26, 2010

(51) Int. Cl.
*G06F 3/00* (2006.01)

(52) U.S. Cl. .......................... 715/854; 715/819; 715/829

(58) Field of Classification Search .................. 715/854, 715/819, 829
See application file for complete search history.

(56) References Cited

U.S. PATENT DOCUMENTS

| | | | |
|---|---|---|---|
| 6,034,689 A * | 3/2000 | White et al. | 715/854 |
| 6,538,670 B1 * | 3/2003 | Kido | 715/767 |
| 7,055,108 B2 * | 5/2006 | Goloshubin et al. | 715/853 |
| 7,062,717 B2 * | 6/2006 | Scott | 715/767 |
| 7,554,525 B2 * | 6/2009 | Aoyama | 345/157 |
| 7,571,393 B2 * | 8/2009 | Premchandran et al. | 715/767 |
| 7,631,278 B2 * | 12/2009 | Miksovsky et al. | 715/857 |
| 7,788,601 B2 * | 8/2010 | Scott | 715/812 |
| 8,060,836 B2 * | 11/2011 | Duarte | 715/784 |
| 2001/0017634 A1 * | 8/2001 | Scott | 345/767 |
| 2002/0178142 A1 * | 11/2002 | Higashigawa | 707/1 |
| 2004/0090463 A1 * | 5/2004 | Celik et al. | 345/767 |
| 2004/0100500 A1 * | 5/2004 | Chung et al. | 345/767 |
| 2005/0212768 A1 * | 9/2005 | Toda et al. | 345/162 |
| 2006/0112346 A1 * | 5/2006 | Miksovsky et al. | 715/764 |
| 2006/0277503 A1 * | 12/2006 | Maehiro et al. | 715/856 |
| 2009/0295826 A1 * | 12/2009 | Good et al. | 345/619 |
| 2011/0283184 A1 * | 11/2011 | Atanassov et al. | 715/243 |

* cited by examiner

*Primary Examiner* — Ryan Pitaro
(74) *Attorney, Agent, or Firm* — Lee & Hayes, PLLC

(57) ABSTRACT

Optimized object traversal techniques are presented to move an object focus in an intuitive manner in a display interface using a navigational controller. The optimized object traversal enables two-directional movement (e.g., up, down, left, right, or other direction) of the object focus and not confined to a sequential movement order. The optimized object traversal may vary an order of the object focus selection between objects based on a selection path of a user (e.g., which object previously had the object focus). The optimized object traversal techniques use an edge point on the object having a current object focus to identify a next object to receive the object focus. Objects may be identified based on an orthogonal alignment, a distance from the edge point, a container order (e.g., in tie breaking instances) and/or by a coded assignment.

21 Claims, 8 Drawing Sheets

OBJECT TRAVERSAL TO SELECT FOCUS

BACKGROUND

People use electronic devices to access a wealth of information. Many electronic devices include a display to enable a user to view information, select menus, input data, and interact with other data. The devices may include a navigation controller to allow users to operate the devices. For example, navigation controllers may include one or more of a keyboard, a mouse, a direction pad (d-pad), a touch screen, a joystick, a trackball, or other input control features to enable a user to navigate through information presented on the display.

A direction pad is just one example of a navigation controller that includes axes of two-dimensional space (having components of up, down, left, and right) and optionally including a selection control. A keyboard may use at least four separate buttons where each button is dedicated to one of the components of up, down, left, and right. In some instances, a direction pad may use a single feature (e.g., pad) that enables user selection of each direction commands depending on where the user touches the direction pad. For example, a depression of a top portion of the pad may translate to an 'up' selection while a center depression may be used to activate a selection control.

Display interfaces, such as websites, often include interactive objects that users may select, use to transmit information, or otherwise interact with to create a desired outcome. For example, a graphical user interface (GUI) may include a text box for entering text, a virtual button to submit a command, radial buttons to toggle response options, and so forth. Each of these objects may be selected and then manipulated by user input to create a desired outcome. When the user navigates the display interface using a navigational controller, the user is typically confined to having an object focus move between objects based on a preset sequential order (e.g., tab order). The object focus refers to a selected object that the user currently can manipulate (e.g., an active object ready for user input). Often, the preset sequential order is based on a container order of the objects as listed in the underlying computer program code. This makes navigation of the display interface with a navigational controller confusing and difficult for a user at times.

In some instances, developers may modify an object focus routine by assigning object focus from each object. However, this requires additional work by the developers and is specific to a single implementation. In addition, the assignment may still confuse the user to moving between objects in a confusing path.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, navigation of objects in a display interface using a navigational controller is often difficult when object focus is sequentially ordered, such as by a container order or a hard-coded (developer-based) order. An object is an element of an interface that can receive a focus ("object focus") based on user navigation, such as buttons, text boxes, pages or portions thereof (e.g., edge, previous/next page, etc.), navigational inputs, and so forth. When the object has the object focus, the object may be manipulated by the user and/or deselected to remove the object focus. The object focus may be made visible to a user by a visual indicator (e.g., highlight, color, shadow, or other visual indicators).

As disclosed herein, an optimized object traversal technique is presented to select an object focus in the display interface in an intuitive manner using the navigational controller. A navigation controller may be a direction pad (d-pad), a keyboard, a joystick, a trackball, or other input to enable a two-dimensional command direction. The optimized object traversal may vary an order of the object focus movement between objects based on a selection path received from a user. To illustrate, assume that four objects are included in a display (A, B, C, D). Using container order or any other sequential order, the object focus may move forward or backwards in a set order such as A→B→C→D→(repeat) based on received user commands (e.g., tab, shift+tab, navigational controller commands, etc.). When an object focus is on object B and a command to move back is received from the user, the object focus traditionally moves to object A, then back to object D, and so forth.

The optimized object traversal techniques, meanwhile, determine the object point location based on the current object focus and an edge point on the object. By using both of these factors, the object focus is not confined to a sequential order, but may be dynamic. For example, after a down command, the object focus may sometimes move from object B to object D while at other times move from object B to object C depending on where the edge point is located on object B.

Besides making navigation of objects in a display interface more intuitive by user control via a navigational controller, the optimized object traversal may eliminate or reduce unnecessary duplication of effort by developers who customize object traversal for a specific display interface. Portions of the optimized object traversal techniques may be modified, disabled, or overridden by developers when necessary, but may otherwise enable intuitive navigation of objects with little or no extra coding by a developer.

The techniques and systems described herein may be implemented in a number of ways. Example implementations are provided below with reference to the following figures.

Illustrative Device

Figure 1:
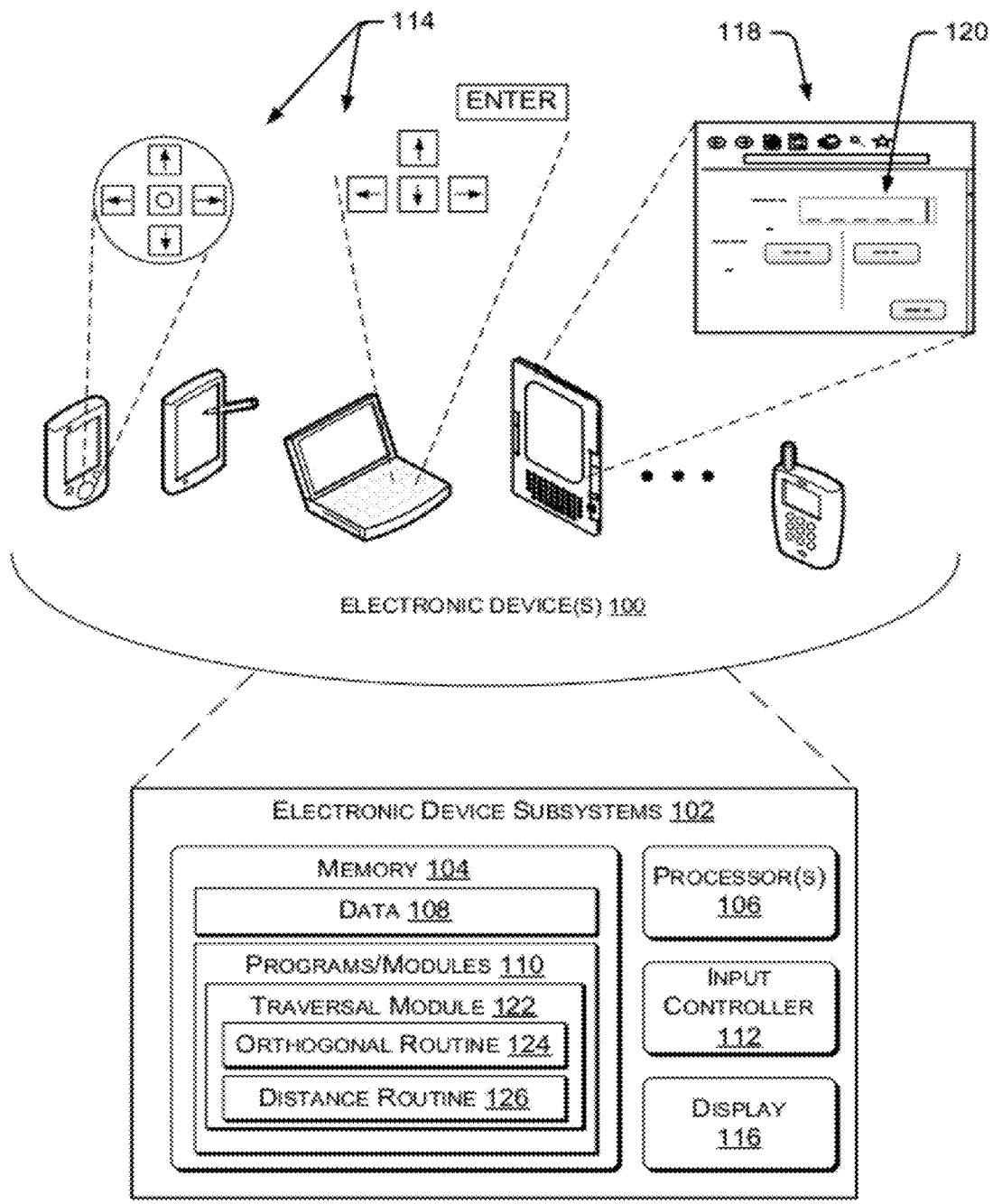
FIG. 1 is a schematic diagram of illustrative computing devices to provide optimized object traversal.

FIG. 1 is a schematic diagram of illustrative computing devices (or simply "devices") 100 to provide optimized object traversal. In the illustrated implementation, the devices 100 are represented by various electronic devices, each of which includes a display. A non-exhaustive list of the devices 100 may include a notebook computer, a music player, a personal digital assistant (PDA), a mobile telephone (including smartphones), a tablet computer, an electronic book (eBook) reading device, a netbook computer, and a set top box. However, virtually any other type of electronic device may be used to provide an output to a display (either integrated or external), and allow a user to interact with a display interface.

As illustrated, the devices 100 may include electronic device subsystems 102. In some embodiments, the subsystems 102 include memory 104 and processor(s) 106. The processor(s) 106 interact with the memory 104 to facilitate operation of the electronic device 100. The memory 104, meanwhile, may be used to store data 108, such as data files, audio and/or video media, eBooks, or the like. The memory 104 may also include software programs or other executable modules ("programs/module") 110 that may be executed by the processor(s) 106. Examples of such programs or modules include indexing modules for indexing data, reader programs, control modules (e.g., power management), network connection software, an operating system, sensor algorithms, page turn detectors, and the like.

The subsystems 102 may also include an input controller 112. The input controller may interact with user controls of the devices 100, which are referred to herein as a navigation controller 114. The navigational controller 114 enables a user to select a direction along axes of two-dimensional space (up, down, left, right or combinations thereof (up-right, etc.)), and optionally include a selection option (e.g. depression of center of pad, separate button, etc.). A user may make selections on a display interface by interacting with the navigational controller 114, which thereby transmits information to the input controller 112.

In some embodiments, the subsystems 102 may include a display output 116. For example, a smartphone, an eBook reading device, and a notebook computer, among other possible devices, may include the display output 116 as an integrated display. Other of the devices, such as a set top box, desktop computer may include the display output 116 as a connection for an external display (monitor, television). The display output 116 may enable providing a display interface 118 for view and interaction by a user. The display interface 118 may include various objects 120, which may be selected by user input via the navigational controller 114.

Returning to the programs/modules 110, the devices 100 may include a traversal module 122 in accordance with various embodiments. The traversal module 122 may enable the user to move between the objects 120 when the user interacts with the navigational controller 114. The traversal module 122 may include an orthogonal routine 124 and a distance routine 126. The orthogonal routine 124 may locate objects that are orthogonally aligned with a selected object (having an object focus). The distance routine 126 may determine a distance between a selected object and other objects on the display interface 118.

Further details of the operations of the traversal module 122, the orthogonal routine 124 and the distance routine 126 are explained in the following section.

Illustrative Operation

Figure 2:
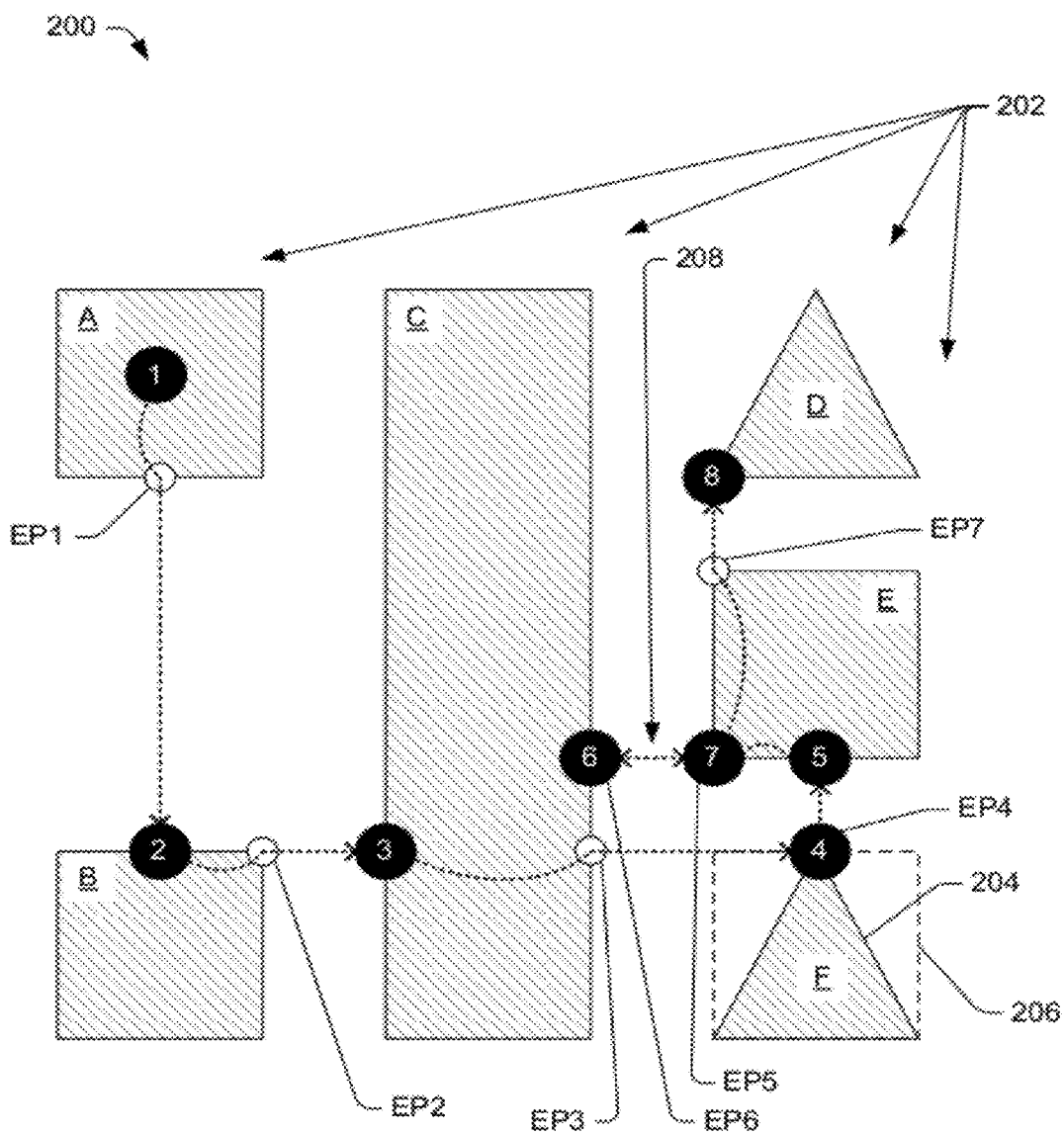
FIG. 2 is an illustrative environment to illustrate optimized object traversal with inner-object traversal in accordance with one or more embodiments.

FIG. 2 is an illustrative environment 200 to illustrate optimized object traversal with inner-object traversal in accordance with one or more embodiments. The schematic diagram is intended to provide illustrative techniques for object traversal that enables a user to move an object focus between objects on a display interface.

The environment 200 includes objects 202, which are shown in FIG. 2 with crosshatching. The objects 202 may include any object that a user may select. For example, the objects 202 may include text boxes, pull down menus, radial buttons, links, scrolling bars, navigational objects, calculation objects, or any other object a user may select to activate a command, input/output data, or otherwise manipulate. For explanatory purposes, the objects 202 are labeled A-F and will be referenced accordingly. Although the environment 200 shows six objects, more or fewer objects may be included in the environment.

The environment 200 shows an illustrative traversal of the objects 202. In various embodiments, the traversal is performed by a user that navigates among the objects using a navigational controller (i.e., the navigational controller 114) such as a direction pad or keyboard. The objects are arranged on a display interface, such as the display interface 118 of FIG. 1.

Initially, when a device (e.g., one of the devices 100) loads a display interface, an object focus is set at an initial object point 1. In this example, the initial object point 1 is located in object A, but the initial object point could be designated at any of the objects 202 in the environment. In some embodiments, the initial point may be moved or relocated by a user command, such as a user-designated location that is received via a touch screen interface on one of the devices 100. An illustrative traversal of the objects 202 is described next, where the user navigates by pressing a directional command (up, down, left, right) on a navigational controller.

A user may first desire to move the object focus to object B. To accomplish this, the user selects a command direction of 'down', which in turn instructs the traversal module 122 to move the object focus from object A to another object located in the 'down' direction. In the environment 200, object B is an obvious choice (and user intended choice) for the next object following a user selection of the down command. However, the traversal module 122 follows a technique described below to determine this course of action.

In various embodiments, the traversal module 122 first traverses an object having the object focus (object A) in the command direction (down) to reach an edge point of the object (designated as EP1). Next, the traversal module 122 makes a second traverse (move/jump) based on the edge point EP1, where the second traverse is still based on the original command direction of 'down.' In some embodiments, the traversal module 122 selects an object that is orthogonally aligned with the edge point EP1 in the command direction (down). In various embodiments, an imaginary line may be drawn in the command direction from EP1 to locate an orthogonally aligned object. A selected orthogonally aligned object is a first object that intersects this imaginary line when traced from the edge point EP1 of object A. This first object is then selected as the next object, which is object B in environment 200.

The traversal module 122 traverses to object B from object A (via edge point EP1), which in turn moves the object focus from object A to object B. From a user perspective, the user presses the down button and then the object focus moves directly from object A to object B, which may be displayed graphically by a change in the representation of object A and object B (e.g., change of color, shadow, highlight, etc.).

Next, the user may select a command direction of 'right' with the navigational controller. Using the same logic as discussed above, the traversal module 122 may traverse from the object point 2 to an edge point EP2 to the object C at object point 3 in response to the command direction of 'right.' The significance of the object point 3 will be apparent after the next illustrative move by the user in the command direction of 'right.'

When the user selects the command direction of 'right', the traversal module 122 begins at object point 3 and traverses object C in the 'right' direction to edge point EP3. Next, the traversal module 122 selects an object that is orthogonally aligned with the edge point EP3 in the command direction (right). Using the techniques described above, the traversal module 122 traverses from edge point 3 to object point 4 of object F. The object point 4 is located on the boundary 204 of object F, which may be different than a rectangle bounding box 206 of the shape when the boundary is not rectangular. Accordingly, the object focus moves from object C to object F. The user may then interact with object F, such as by selecting the object, activating the object, providing data input in the object, or by taking other actions.

To highlight the significance of the movements of the object focus as described thus far, it is helpful to examine other techniques that are employed to move between objects. Using a sequential order (limited to commands of 'forward' and tackward'), the order of traversal among the objects 202 may be predetermined and thus restrict a user from selecting a desired next object without cycling through other objects first. For example, if the sequential order is A→B→C→D→E→F, then the user would have to advance the direction from object C to object F using intermediary objects D and E.

Using basic X-Y spatial navigation of the objects makes the move from object C in the command direction of 'right" unclear when an object point is not associated with the object C based on an entry into object C from a previous traversal (in the example, from object B). For example, an X-Y spatial navigation technique may use a centroid of a shape to determine a next move. Using the centroid of object C, the next object in the command direction of 'right' may be object E (assuming an orthogonal traversal). However, object D may be an equally viable candidate in some implementations as each of objects D, E, and F are equally spaced apart from object C in the command direction of right, thus object D may be selected due to its upmost location in the display interface of the environment 200. Using the optimized traversal techniques described herein, a traversal to object F after a received command direction of 'right' from object C is intuitive when the user knows the previous object location was at object B.

As illustrated here, it may be difficult for a user to determine which object will be selected next using sequential order or the basic X-Y spatial navigation. With this in mind, further user-initiated traversals among objects are discussed in the continued example, and complementary actions by other techniques will be discussed for contrasting purposes.

The user may next desire to move from object F to object E and accordingly select the command direction of 'up.' The traversal module 122 may first traverse the object F in the command direction to the furthest edge point EP4, which in this instance may be the same location as the object point 4. From edge point EP4, the traversal module 122 traverses in the command direction to the next orthogonally aligned object, which is object E, and locates object point 5. Accordingly, the object focus moves from object F to object E. After interacting with object E, the user may select the command direction of 'left.' Using the techniques described above, the traversal module 122 may locate object point 6 on object C from an edge point EP5 in response to the user selection of 'left' on a navigational controller, thus moving the object focus to object C. Again, after interacting with object C, the user may select the command direction of 'right.' Using the techniques described above, the traversal module 122 may locate object point 7 on object E from an edge point 6 in response to the user selection of 'right,' thus moving the object focus back to object E. Unlike the previous move from object point 3 to object point 4 (object C to object F), this move includes a same object origin (object C), but a different object move (to object E) even though both moves were from object C and had a command direction of 'right.'

In a final example traversal, the user may select the command direction of up to move the object focus from object E to object D. The traversal module 122 may first traverse the object E in the command direction (up) to the edge point EP7. From edge point EP7, the traversal module 122 traverses in the command direction to the next orthogonally aligned object, which is object D, and locates object point 8. Accordingly, the object focus moves from object E to object D.

In the example above, the traversals (moves) between objects C, F, E, and C may be mapped as follows: C→F→E→C→F→D. Using sequential order, the user could not move as described above without cycling through additional object because the user did not follow a linear traversal through the objects 202. More specifically, the user moved from object E to object C in one instance and from object E to object D in another instance, which is not possible using a sequential order traversal of objects.

Using a basic X-Y spatial navigation, the user's intended traversal from object E to object C and then back to object E may not result in an intuitive movement of the object focus as intended by the user. More specifically, since the edge point 6 is established on the object C, the traversal module 122 has effectually left a virtual bread crumb trail 208 on the object which enables the traversal module 122 to return to the previous object (object E) up selection of an opposite command direction (right) as the preceding command direction (left). Using basic X-Y spatial navigation, no virtual bread crumb trail is left and the object focus may not always return to the preceding object. For example, when the basic X-Y spatial navigation moves right from object C, any of the objects D, E, and F are equal candidates for the object focus absent the virtual bread crumb trail left in the optimized object traversal described herein.

Figure 3:
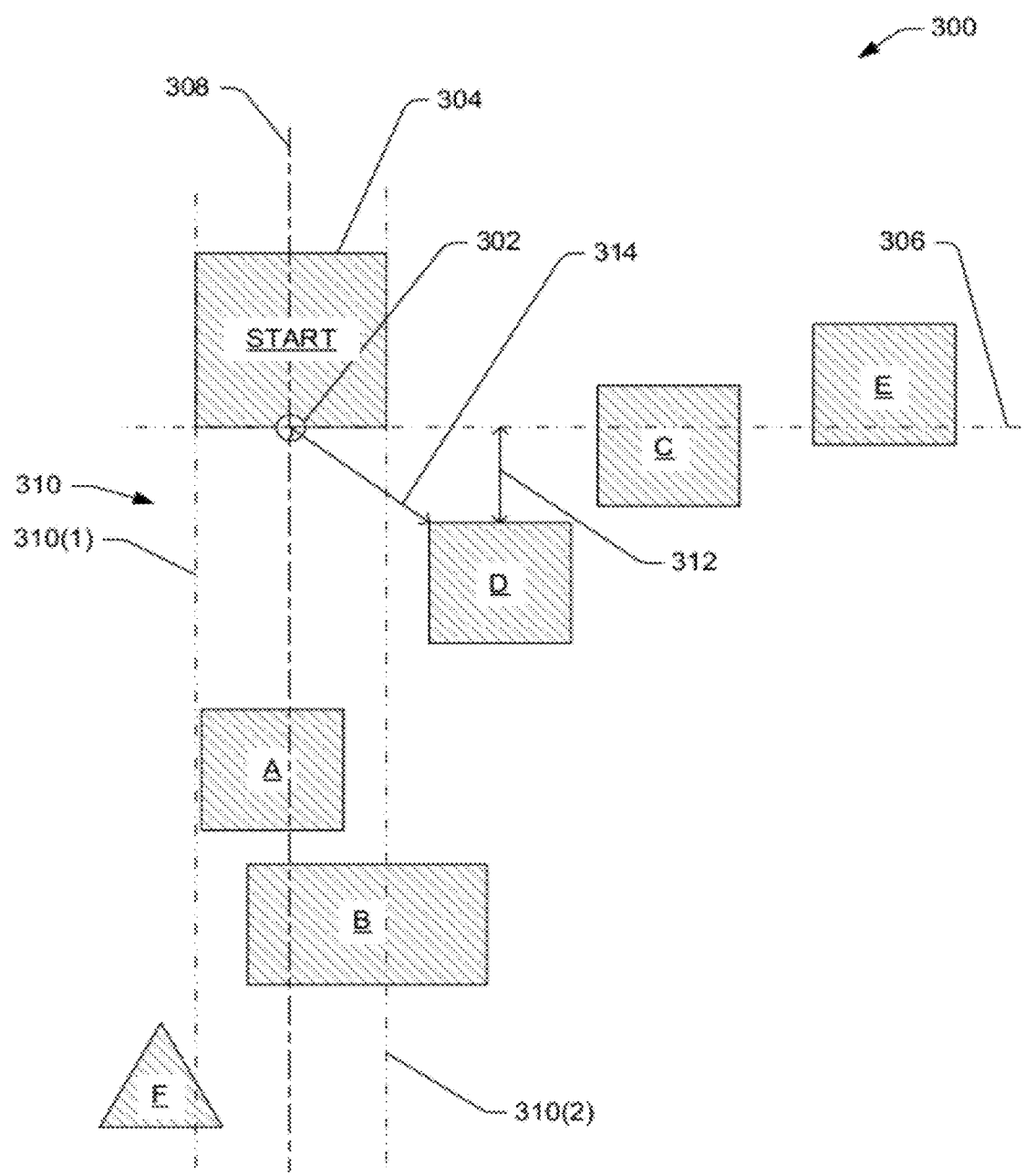
FIG. 3 is a schematic diagram of an illustrative environment showing prioritizations of an optimized object traversal in accordance with various embodiments.

FIG. 3 is a schematic diagram of illustrative environment 300 showing prioritizations of an optimized object traversal in accordance with various embodiments. In the discussion of the traversals among the objects 202 in FIG. 2, the command direction was discussed as moving in a two-dimensional direction relative to an object point. The environment 300 further defines possible selections and/or prioritizations of a subsequent object from an edge point 302 located on a focused object 304.

The following discussion is based on a command direction of 'down' from the focused object 304 using the edge point 302. From the edge point 302, two reference lines can be drawn to represent the X-Y axes (directions). An x-axis 306 and a y-axis 308 intersect at the center of the edge point 302. In some embodiments, boundary lines 310 of the object having the edge point 302 may be labeled as a first boundary 310(1) and a second boundary 310(2). These axes/lines/boundaries may be used to determine a next object when the command direction is down (or up). Similarly situated lines, although rotated 90 degrees around the edge point 302 or the focused object 304, may be used when the command direction is right or left.

In accordance with embodiments, a next object (one of objects A-F) may be selected based on an orthogonal alignment with respect to the edge point 302 or the focused object 304. When none of the objects are orthogonally aligned with the edge point 302 and/or the focused object 304, then secondary considerations may be used to select the next object. Both the orthogonal and secondary considerations are described next with illustrative selections of the objects A-F in the environment 300.

In some embodiments, the orthogonal routine 124 may use an orthogonal imaginary line technique to select the next object. In this technique, an imaginary line may be drawn from the edge point 302 in the command direction, which is along the y-axis 308 in this example. A nearest object to the focused object 304 that is intersected by the imaginary line in the command direction is selected as the next object. When objects A-F are present, the next object using this illustrative selection is object A. If object A is not present in the environment 300, a prioritization would select the next object as the object B. If objects A and B are not present, then no objects would be selected based solely on imaginary line technique because the imaginary line does not intersect any other objects in the environment 300 except for objects A and B (which in this last scenario are assumed to be omitted from the environment 300).

In various embodiments, the orthogonal alignment may be expanded to include objects that are intersected by one of the boundary lines 310 or situated between the boundary lines. This technique may be referred to as an orthogonal object boundary technique. In the environment 300, objects A, B, and F meet this criteria, where only object A is situated between the boundary lines 310. The orthogonal object boundary technique may be used either singly or in combination with the orthogonal imaginary line technique described above. For example, in one implementation, a priority may be given to objects that are selected using the orthogonal imaginary line technique (objects A, B), which is then followed by objects that meet the orthogonal object boundary technique (object F).

In some instances, such as when environment 300 does not include any of the objects A, B, or F, no objects may meet the above referenced orthogonal criteria. In these instances, secondary considerations may be used to select an object in the environment 300.

In some embodiments, the distance routine 126 may use a distance technique as at least one of the secondary considerations. A distance may be measured from the edge point 302. An axis distance technique may measure a uniaxial distance 312 in the direction of the command direction to a candidate object (in the direction along one of an x-axis or a y-axis). An absolute distance technique may measure an absolute distance 314 to a candidate object, which may include a distance traversing along both axes (x-y) (i.e., hypotenuse). The distances (either axis or angular) may be measured from the edge point 302 (or the focused object 304) and a portion of a candidate object (edge, centroid, etc.). Some objects may be disqualified from being candidate objects based on a location in relation to the x-axis 306 (or when the command direction is left/right, then in relation to the y-axis 308).

In some embodiments, objects that are intersected by the x-axis 306 or located above the x-axis are disqualified from being candidate objects using the distance technique (body disqualifier). In some embodiments, objects having a centroid above the x-axis 306 (or possibly intersected by the x-axis) are disqualified from being candidate objects using the distance technique (centroid disqualifier).

The following examples illustrate implementation of the various secondary considerations using distance as discussed above. The following examples assume the environment 300 only includes candidate objects C, D, and E in addition to the focused object 304. Using the axis distance technique, a command direction of down from the edge point 302 may select object E using the body disqualifier and object C using the centroid disqualifier (because object E would be disqualified for having a centroid above the x-axis 306). Object D would not be selected because the axial distance 312 for object D is greater than the axial distance of objects C and E. Using the absolute distance technique, a command direction of down from the edge point 302 may select object D because this object has the shortest instance of the absolute distance 314. In some embodiments a combination of the axis distance technique and the absolute distance technique may be used to prioritize selection of a next object from the candidate objects.

Figure 6:
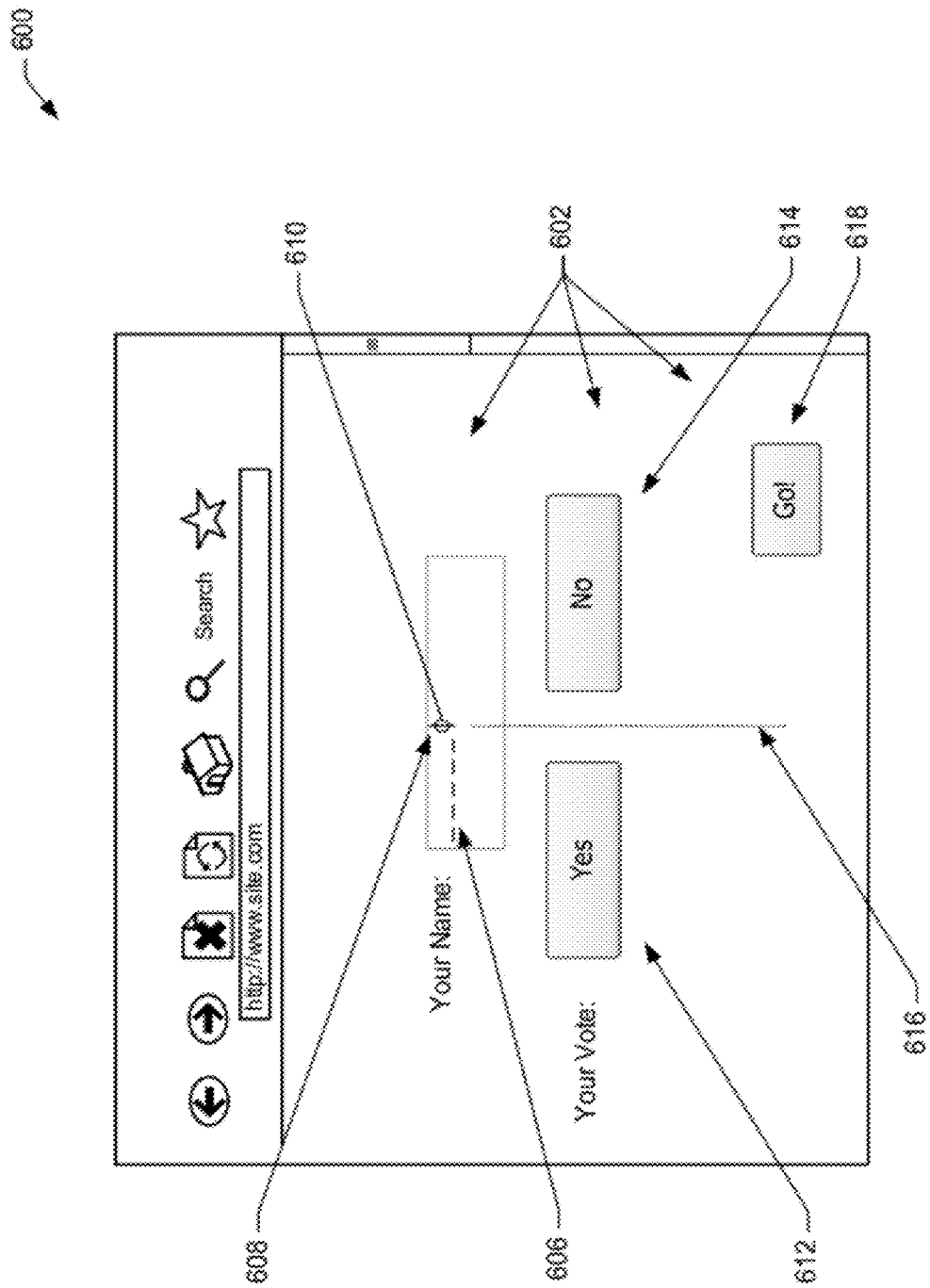
FIG. 6 is an illustrative page using optimized object traversal with a text box and bisecting objects.

In accordance with various embodiments, the traversal module 122 may use a container order to select the next object from candidate objects. In some instances, when a tie exists using the orthogonal techniques and/or the distance techniques (e.g., in a symmetrical configuration of objects), two or more candidate objects may have the same distance. The container order may be used as a secondary consideration as a tie breaker to assign movement to the next object. This concept is also illustrated in FIG. 6 and discussed in the corresponding description.

Although the command directions discussed in FIGS. 2 and 3 relate to the four primary directions of up, down, left, and right, the techniques described herein may be implemented with additional command direction from the navigational controller 114. For example, when the user inputs a command by pressing on a d-padre at approximately a 2:00 position (upper right), then the command direction may be directed at 60 degrees to the right of an up command direction. Accordingly, orthogonal alignment may be based on the angle of the command direction and be defined based on parameters that are parallel to the command direction. In addition, the objects may have a boundary that is rectangular or non-rectangular, such as shapes having boundaries that are circular, triangular, or random (e.g., bubble, cloud, etc.) in form.

Figure 4:
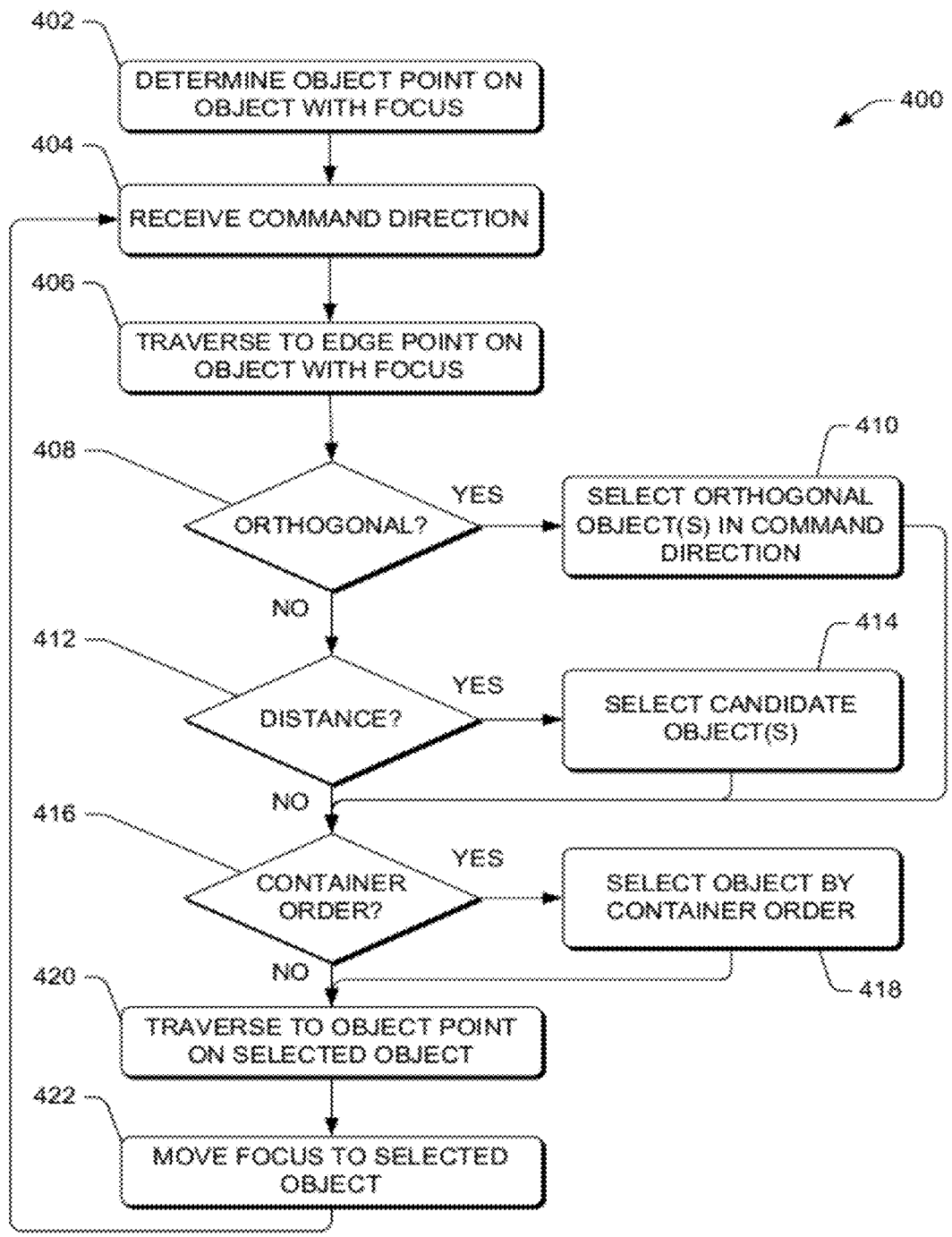
FIG. 4 is a flow diagram of an illustrative process to provide optimized object traversal with prioritized object selection.

FIG. 4 is a flow diagram of an illustrative process 400 to provide optimized object traversal with prioritized object selection. The process describes one of various prioritization possibilities for using the various techniques of object selection of FIG. 3 in combination. However, other prioritizations using the above disclosed techniques are contemplated in variations of the process 400. The operations may be performed by the traversal module 122 and/or the orthogonal routing 124 and the distance routine 126 shown in FIG. 1.

The process 400 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 400, shall be interpreted accordingly.

At 402, the traversal module 122 may determine the initial object point on a object having an object focus, such as the initial object point 1 on object A as shown in FIG. 2.

At 404, the traversal module 122 may receive a command direction. The command direction may be selected by a user via a navigational controller (e.g., a direction pad, etc.), which may be implemented as a four-way controller (up, down, left, and right) plus a selection control.

At 406, the traversal module 122 may traverse the object having the object focus in the command direction to an edge point on the object. Again referring to FIG. 2, the edge point may be edge point EP1 of the object A.

At 408, the traversal module 122, via the orthogonal routine 124, may determine whether an object is orthogonally aligned with the edge point and/or current object. The orthogonal routine 124 may determine whether an orthogonally aligned object exists using the orthogonal imaginary line technique, the orthogonal object boundary technique, or a combination of both techniques. When the orthogonal routine 124 locates an orthogonally aligned object, then the process 400 may proceed to operation 410.

At 410, the orthogonal routine 124 may select the nearest orthogonally aligned object (or objects in the case of a tie) in the command direction based on the orthogonal imaginary line technique, the orthogonal object boundary technique, or a combination of both techniques.

When no object is orthogonally aligned with the edge point and/or current object, the process 400 may proceed to decision operation 412. At 412, the traversal module 122, via the distance routine 126, may determine whether one or more candidate object are eligible for selection based on the absolute distance technique, the axis distance technique, or a combination of both techniques. When the distance routine 126 locates a candidate object, then the process 400 may proceed to operation 414.

At 414, the distance routine 126 may select the nearest candidate object (or objects in the case of a tie) in the command direction based on the absolute distance technique, the axis distance technique, or a combination of both techniques.

When the distance routine 126 fails to identify an object as a candidate for the distance techniques at 412, the process 400 may proceed to decision operation 416. At 416, the traversal module 122 may determine whether to select the next object by container order, which may be performed at 418. In addition, upon a tie of objects at the operations 410 or 414, the decision operation 416 may resolve a tie breaker to select one of the objects via the container order or another secondary consideration. For example, the two objects may have an equal distance from an edge point, and thus both may be selected at the operation 410 or 414. At 416, the traversal module 122 may then determine one of the objects is to be selected based on the container order at 418. When container order is not used at the decision operation 416, or after the container order is used to make an object selection at 418, the process may proceed to operation 420.

At 420, the traversal module 122 may traverse to the object point on the new object, which is selected by one of the operations 410, 414, and/or 418.

At 422, the traversal module 122 may move the object focus to the selected object. The process 400 may repeat upon receipt of a new command direction from the user by proceeding to the operation 404.

Figure 5:
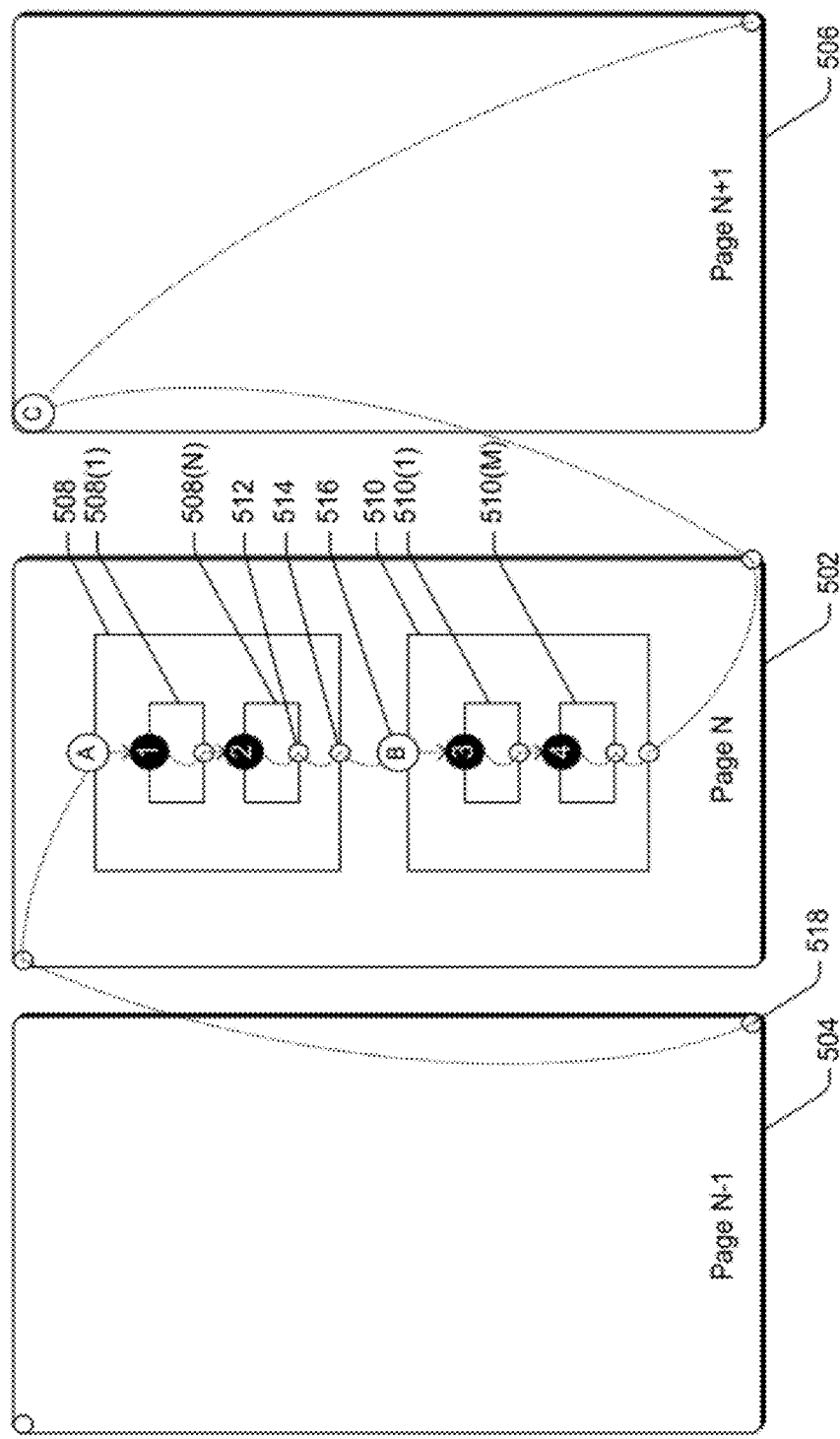
FIG. 5 is a schematic diagram of an illustrative environment showing page traversing and parent child traversing of an optimized object traversal.

FIG. 5 is a schematic diagram of illustrative environment 500 showing page traversing and parent child traversing of an optimized object traversal. The environment 500 includes a current page 502, a previous page 504, and a subsequent page 506. In addition, the current page 502 includes a first parent object 508 and a next parent object 510. Each of the parent objects 508, 510 further include child objects 508(1)-(N) and 510(1)-(M), respectively. The quantity of objects and arrangement of the objects in the environment 500 is provided for illustrative purposes and other arrangements and quantities of objects may be traversed using the optimized traversal techniques disclosed herein.

An illustrative traversal may begin on the current page 502 at an initial object point of either object point A or object point 1. For example, when the first parent object 508 only contains child objects but otherwise no user interactive features, the (scroll bars, selectors, etc.), then the traversal module 122 may direct the initial object focus from the initial object point A to the initial object point 1. However, in some embodiments, each object may receive the object focus, and thus the initial object point A may be initially selected in this 'active state'. This option may be activated by a developer, as discussed below with reference to FIG. 8.

The environment 500 shows a traversal of the objects when the traversal module 122 receives a repeated command direction of 'down' from a user. When each object is selected (using the active state), the traversal through objects after moving through respective edge points may be as follows: A→1→2→B→3→4→C. After the fourth object selection, a subsequent command direction of 'down' may result in a navigation advancement (e.g., page turn to the subsequent page 506, scrolling down a page, etc.). After the navigation advancement, the next object (parent/child) or the next page may receive the focus. Using the non-active state, the traversal through objects may be as follows: 1→2→3→4.

When traversing from the child object 508(N) in the down direction, the edge points 512 and 514 may be intermediary points before the traversal module moves the object focus to the second parent object 510. As discussed above, in this circumstance, when the traversal module 122 is not operating in the active state, the object focus may move past the second parent object 510 (at object point B) to object point 3 on the child object 510(1).

When the object focus is at object point A (or at object point 1 and the traversal module 122 is not in the active state), the command direction of 'up' may move an object focus to an edge point 516 located near the bottom right of the previous page 504. The location of the edge point 516 may be language specific and thus be located at a point of the previous page 504 in accordance with specific language-based rules (e.g., reading left to right in English, etc.).

In some embodiments, the traversal module may move an object focus beyond a page view when a page includes navigational instruments (e.g., scroll bars, touch screen scrolling, etc.) to allow a user to navigate to other parts of a page that are located beyond the page view. In this way, when an object at an edge of a page view is the last object viewable without using the navigational instruments, then object traversal may move in the command direction to an object outside of the page view or move to an edge of the page view, which may ultimately enable navigation beyond the page view.

FIG. 6 is an illustrative page 600 showing optimized object traversal with a text box and symmetrically aligned objects. In accordance with various embodiments, the traversal module 122 may traverse objects 602 of the page 600 as described in an example below. Although FIG. 6 shows the page 600 as viewed by a browser, other viewing programs or interfaces may be used to implement the optimized object traversal.

The traversal module 122 may select a text box object 604 to have an object focus. The text box may enable a user to enter text 606 (letters, numbers, symbols, etc.). A text cursor 608 may denote a position of text entry. In some embodiments, an object point 610 may move with the text cursor as a user enters text in the text box. The object point 610 may determine an origination point of a next command direction, which then may determines which object is selected as a result of the command direction. For example, when the user only enters a single letter of text in the text box 604, then the object point 610 may be located at a point in the text box object 604 that is above an object 612. When the user enters more text in the text box 604, and thus the text cursor moves to the far right of the text box, then the object point 610 may be located at a point in the text box object 604 that is above an object 614. In some text boxes, the cursor may follow a language flow pattern and move down (or up) within the box as lines are filled with text or other characters.

In some instances, the object point 610 may be located directly between two objects, shown on the page 600 as the object 612 and the object 614 with a bisecting line 616 (an imaginary reference line). When the object point 610 is aligned with the bisecting line 616, then a subsequent command direction of 'down' results in a traversal from the object point 610 in the down direction. This command direction creates a tie between the objects 612, 614 because both objects are orthogonally aligned with the text box 604 or the object point 610 (which moves with the text cursor 608) and the distance between the objects and the object point is equal. In this instance, a secondary consideration may be used to break the tie. In some embodiments, the container order of the objects in the computer code may be used to break the tie as shown in FIG. 4 at operation 416 and 418 following the operations 410 (orthogonal) or 414 (distance).

In accordance with various embodiments, other objects may allow interior navigation and movement of the object point 610 within the object based on position of a pointer (e.g., a cursor, etc.). Additional examples of objects that may have interior navigation may include without limitation a drawing object (e.g., sketch within an object), a spreadsheet object (e.g., navigate between cells in an object), and so forth.

A subsequent command direction of 'down' may enable the use to select another object 618. In various embodiments, a default selection may be used in a tie breaker (e.g., a prioritization favoring 'up' and 'left' over 'down' and 'right,' etc.).

Figure 7:
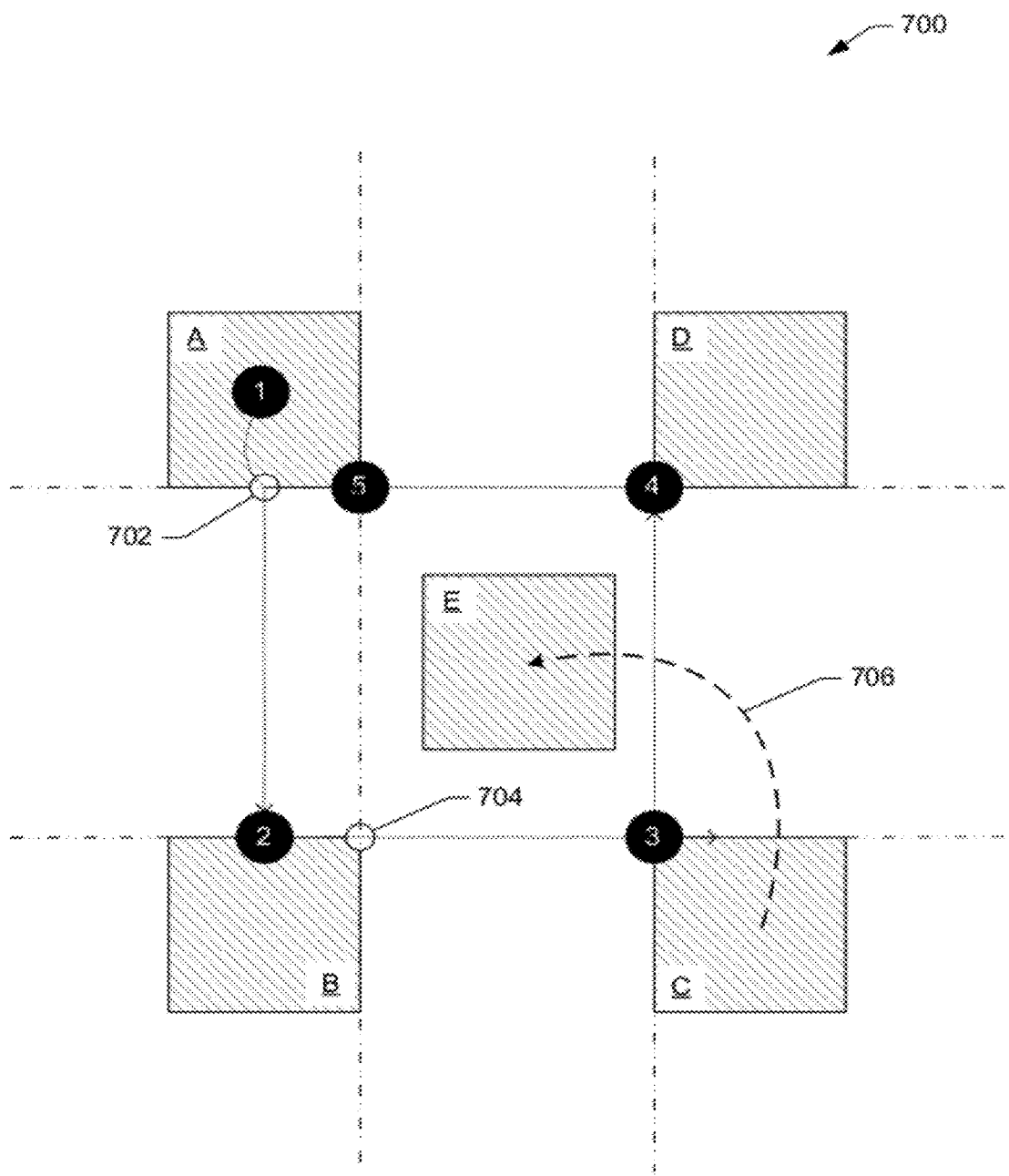
FIG. 7 is a schematic diagram of an illustrative non-orthogonal object configuration.

FIG. 7 is a schematic diagram of illustrative non-orthogonal object configuration 700. The traversal module 122 may begin at an object point 1 on object A. After receiving a command direction of 'down,' the traversal module 122 may move an object focus to an object B at an object point 2 via an edge point 702 using the techniques discussed above. After a command direction of 'right,' the traversal module 122 may move an object focus to an object C at an object point 3 via an edge point 704. Sequential command directions of 'up' and 'left' may then move the object point to object points 4 and 5, respectively.

As shown in the illustrative series of command directions (down, right, up, left), the object focus moves among objects as follows: A→B→C→D. In such an instance, object E is not selectable because another object is orthogonally aligned with a respective edge point (or object point) and thus object E is bypassed for a selection of the orthogonally aligned object. In accordance with embodiments, a developer may override or otherwise disable the orthogonal routine 124 to enable a traversal to object E, such as via a route 706. For example, the distance routine 126 may select object E over another object because of a close proximity of object E from object C.

Figure 8:
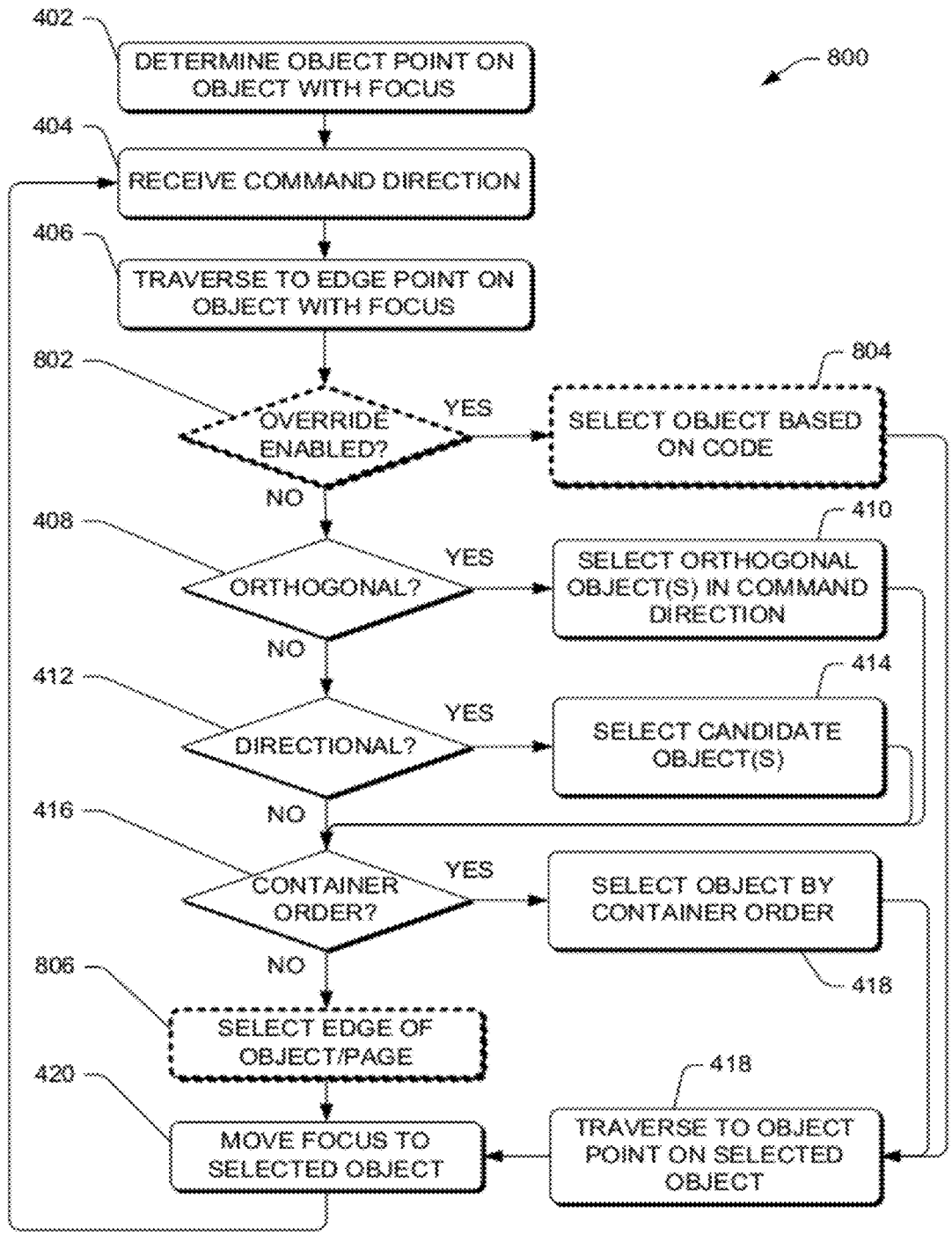
FIG. 8 is a flow diagram of an illustrative process to perform optimized object traversal with a non-orthogonal object configuration.

FIG. 8 is a flow diagram of an illustrative process 800 to perform optimized object traversal with a non-orthogonal object configuration. The process 800 includes processes that are the same or similar to those described with reference to the process 400 and FIG. 4, and thus to avoid needless repetition, are not described in detail with reference FIG. 8. Instead, the process 800 shows operations to incorporate the features described with reference to FIGS. 5-7.

After a traversal to an edge point on an object having the object focus at 406, the traversal module 122 may determine whether to enable an override at 802. A developer may desire to override the traversal module 122 or portion thereof (e.g., the orthogonal routine 124 and/or the distance routine 126), which in turn may direct the process 800 to the operation 804.

At 804, the traversal module 122 may select an object designated by computer code (rather than by orthogonal alignment or distance). However, when the override is disabled at 802, the traversal module 122 may select an object using orthogonal alignment or secondary considerations (distance, container order, etc.) a shown in operations 408-418. In some embodiments, a developer, via manipulation of the traversal module 122, may disable one of the orthogonal routine 124 and/or the distance routine 126. For example, an override to disable the orthogonal routine 124 may enable the selection of object E shown in FIG. 7.

At 806, following a decision of 'no" from container order at decision operation 416, the traversal module 122 may select an edge of an object or a page. A page selection is illustrated in FIG. 5 and discussed above, such as by object/page point C. The operation 806 may enable a user, via a command direction, to move between pages of a display. For example, when the device 100 is an eBook reading device, the user may select the command direction of right or down to move to a next page when no objects are orthogonally aligned and no candidate objects exist for a distance selection. In a web-based environment, the use may move (scroll) up, down, left, or right using a similar technique.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method of traversing objects in a display interface, the method comprising:

designating a first object at an initial object point within the display interface to receive an object focus;

receiving a command direction to cause a two-dimensional movement to a second object;

traversing in the command direction from the initial object point to an edge point of the first object within the display interface;

determining whether the second object is orthogonally aligned with the first object with respect to the command direction and based at least in part on the boundary of the first object or the edge point;

upon determination that the second object is orthogonally aligned with the first object, selecting a nearest edge point on the second object by traversing in the command direction from the edge point of the first object to the nearest edge point on the second object;

upon determination that the second object is not orthogonally aligned with the first object, selecting the second object based at least in part on a distance between the edge point and the second object; and moving the object focus from the first object to the second object.

2. The computer-implemented method as recited in claim 1, wherein the determining whether a second object is orthogonally aligned includes determining whether the second object is a nearest orthogonally aligned object with respect to the command direction from the edge point of the first object.

3. The computer-implemented method as recited in claim 1, wherein the determining whether a second object is orthogonally aligned includes determining whether at least a portion of the second object is orthogonally aligned with at least a portion of the first object in the command direction.

4. The computer-implemented method as recited in claim 1, wherein the determining whether a second object is orthogonally aligned includes determining whether the second object is intersected by an orthogonal imaginary line drawn from the edge point of the first object in the command direction.

5. The computer-implemented method as recited in claim 1, wherein selecting the second object based at least in part on a distance between the edge point and the second object includes traversing in the command direction from the edge point of the first object to the nearest edge point on the second object that extends at least partially beyond an axis defined through the edge point of the first object and perpendicular to the command direction.

6. The computer-implemented method of claim 5, wherein the nearest edge point is selected by measuring a uniaxial distance in an x-axis or a y-axis component of the command direction to a candidate object and selecting the second object as the candidate object having a minimized uniaxial distance.

7. The computer-implemented method of claim 5, wherein the nearest edge point is selected by measuring an absolute distance to a candidate object that includes distance components of both an x-axis and a y-axis and selecting the second object as the candidate object having a minimized absolute distance.

8. The computer-implemented method of claim 1, wherein a container order of objects is used to select one of two or more symmetrically oriented objects based at least in part on the command direction and edge point of the first object, the container order to select the second object.

9. One or more non-transitory computer-readable media storing computer-executable instructions that, when executed on one or more processors, performs acts comprising:

receiving a request to move an object focus in a command direction while the object focus is on a first object;

identifying an edge point on a boundary of the first object based on the command direction;

determining if one or more objects are orthogonally aligned with the edge point in the command direction;

responsive to determining that one or more objects are orthogonally aligned with the edge point in the command direction, using an orthogonal technique to move the object focus to a second object that is a nearest orthogonally aligned object; and responsive to determining that no objects are orthogonally aligned with the edge point in the command direction, using a distance technique to move the object focus to a second object that is selected based at least in part on a distance between the second object and the edge point.

10. The one or more non-transitory computer-readable media as recited in claim 9, wherein the acts further comprise identifying a nearest edge point of the second object in the command direction relative to the first object.

11. The one or more non-transitory computer-readable media as recited in claim 9, wherein the orthogonal technique uses an orthogonal alignment determined by extending edges of the first object in the command direction to determine whether the edges, when extended, would intersect or contain at least a portion of one or more objects.

12. The one or more non-transitory computer-readable media as recited in claim 9, wherein responsive to determining that no objects are orthogonally aligned with the edge point, the distance technique selects a nearest object as the second object, the nearest object being at least partially in the command direction with respect to the first object while not being orthogonally aligned with the first object.

13. The one or more non-transitory computer-readable media as recited in claim 9, wherein the instructions further comprise selectably enabling a developer or a user to disable the orthogonal technique and employ the distance technique to select the second object.

14. The one or more non-transitory computer-readable media as recited in claim 9, wherein the command direction originates from an object point within an object based at least in part on interior navigation of the object.

15. The one or more non-transitory computer-readable media as recited in claim 9, wherein the second object is a parent object or a child object of the first object.

16. The one or more non-transitory computer-readable media as recited in claim 9, wherein the second object is at least one of:
an edge of a page that includes the first object,
a previous page object, or
a subsequent page object.

17. A system comprising:
one or more processors; and
memory to store computer-executable instructions that, when executed, cause the one or more processors to:
receive a request to move an object focus in a command direction while the object focus is on a first object;
identify an edge point on a boundary of the first object based on the command direction;
determine if one or more objects are orthogonally aligned with the edge point in the command direction;
responsive to a determination that one or more objects are orthogonally aligned with the edge point in the command direction, move the object focus to a second object that is a nearest orthogonally aligned object; and
responsive to a determination that no objects are orthogonally aligned with the edge point in the command direction, move the object focus to a second object that is selected based at least in part on a distance between the second object and the edge point.

18. The system as recited in claim 17, wherein the memory further stores computer-executable instructions that, when executed, cause the one or more processors to identify a nearest edge point of the second object in the command direction relative to the first object.

19. The system as recited in claim 17, wherein the movement of the object focus to a second object that is a nearest orthogonally aligned object is performed using an orthogonal alignment determined by extending edges of the first object in the command direction to determine whether the edges, when extended, would intersect or contain at least a portion of one or more objects.

20. The system as recited in claim 17, wherein the command direction originates from an object point within an object based at least in part on interior navigation of the object.

21. The system as recited in claim 17, wherein the second object is at least one of:
   an edge of a page that includes the first object,
   a previous page object, or
   a subsequent page object.

* * * * *